US005096162A

United States Patent [19]

Cleveland

[11] Patent Number: 5,096,162

[45] Date of Patent: Mar. 17, 1992

[54] ELECTRIC FENCE WIRE CONSTRUCTION

[75] Inventor: Robert G. Cleveland, Wake, N.C.

[73] Assignee: Delaware Capital Formation, Inc., Apex, N.C.

[21] Appl. No.: 731,418

[22] Filed: Jul. 17, 1991

[51] Int. Cl.[5] .............................................. A01K 3/00

[52] U.S. Cl. ........................................ 256/10; 256/46; 174/27

[58] Field of Search ...................... 256/10, 46; 174/27, 174/28

[56] References Cited

U.S. PATENT DOCUMENTS 462,887 11/1891 Woodard ............................. 256/46
2,927,952 3/1960 Wermine .............................. 174/27
3,223,796 12/1965 Willoughby ...................... 256/10 X
4,162,783 7/1979 Crist, Jr. .............................. 256/10
4,533,120 8/1985 Ruddock ......................... 256/10 X

*Primary Examiner*—Andrew V. Kundrat
*Attorney, Agent, or Firm*—Allegretti & Witcoff, Ltd.

[57] ABSTRACT

An improved fence construction includes an elongated plastic strip with the edges of the strip folded over parallel wires. The wires may be electrified. The plastic strip may be coded, decorated or laminated with other materials to provide an improved fence material for use in combination with fence posts to provide the appearance of a multirail fence, for example.

7 Claims, 1 Drawing Sheet

ELECTRIC FENCE WIRE CONSTRUCTION

BACKGROUND OF THE INVENTION

This invention relates to an improved fencing material and more particularly to an improved fencing material that may be utilized for the construction of an electric fence.

Heretofore, it has been suggested that a fabric or plastic may be utilized as a fencing material. It has also been suggested that strips of plastic be utilized as a fencing material. It has further been suggested that a plastic material with wires imbedded therein may be utilized for the fabrication of an electric fence. Prior patents which teach these various concepts include the following:

| U.S. PAT. NO. | ISSUE DATE | INVENTOR | TITLE |
|---|---|---|---|
| 4,494,733 | January 22, 1985 | Olsson | Enclosure For Animals |
| 4,533,120 | August 6, 1985 | Ruddock | Fencing Rail Members |
| 4,860,996 | August 29, 1989 | Robbins, III | Composite Strand Fence |
| 4,861,645 | August 29, 1989 | Standing | Fencing Tape With Electrically Conducting Wires |
| 4,883,923 | November 28, 1989 | Langlie et al. | Electric Fence Insulator For Holding Various Conductor Types, Including Tape-Type |
| 4,905,968 | March 6, 1990 | Eby et al. | Insulator For An Electric Fence And Electric Fence Including The Same |

There has remained, however, a need for an improved fencing material which can be utilized as part of an electric fence construction and which replicates, from an aesthetic viewpoint, a rail fence. Such fencing material should be easy to manufacture, easy to package and distribute, and easy to incorporate in a fence construction. It is with these goals in mind that the present invention was devised to provide an improved fencing material and fence construction, particularly useful as an electric fence construction.

SUMMARY OF THE INVENTION

Briefly, the present invention comprises an elongated strip of nonconductive plastic material with first and second parallel wires enfolded by the sides of the strip. The sides of the strip are also perforated so as to expose a portion of each of the wires. The wires may thus be fastened, for example, by staples to spaced fence posts in a manner so that the strip appears to be a fence rail. The exposed wire, which is exposed through the perforations or embossments in the plastic strip, permits contact when the wires are electrified and thus provide the benefits of an electric fence construction.

Thus, it is an object of the invention to provide an improved fencing material comprised of an elongated plastic strip and at least, two parallel wires molded or retained by the sides of the strip with a portion of the wires exposed so that the fence material may serve easily as an electric fence material.

Yet a further object of the invention is to provide a method of manufacture of such an improved fencing material.

Another object of the invention is to provide an economical, easily manufactured, easily stored and easily transported fence material which may be quickly and easily assembled as an electric fence or as a non-electric fence construction.

These and other objects, advantages and features of the invention will be set forth in the detailed description which follows.

BRIEF DESCRIPTION OF THE DRAWING

In the detailed description which follows, reference will be made to the drawing comprised to the following FIGURES.

DESCRIPTION OF THE PREFERRED EMBODIMENT

Figure 1:
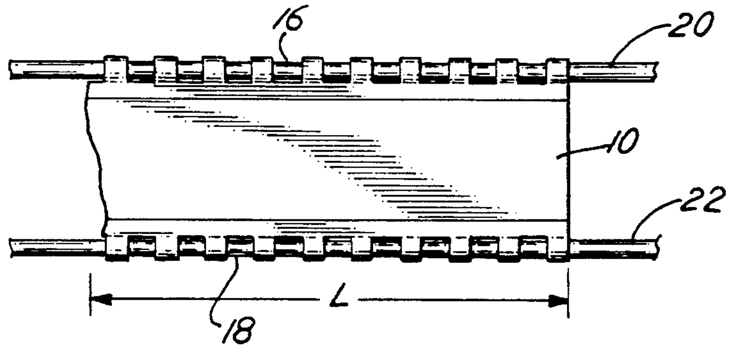
FIG. 1 is a plan view of the backside of the improved fence construction of the present invention.
Figure 2:
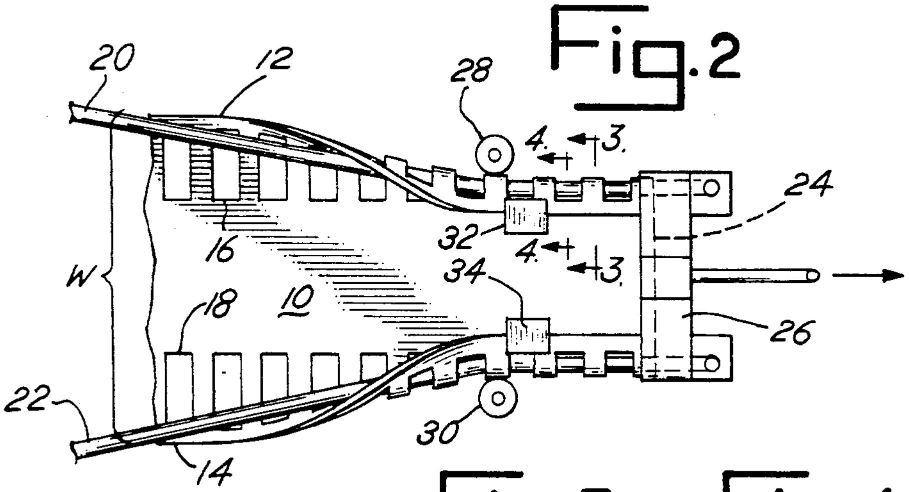
FIG. 2 is a side elevation of the fence construction of FIG. 1 depicting diagrammatically, the method of manufacture.
Figure 3:
FIG. 3 is an enlarged cross-sectional view of a side element of the fence construction of the invention taken substantially along the line 3—3 in FIG. 2.
Figure 4:
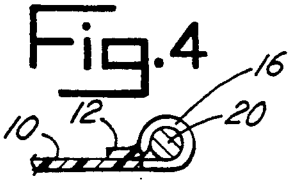
FIG. 4 is an enlarged side cross-sectional view of a side element of the fence construction taken substantially along the line 4—4 in FIG. 2.

Referring first to FIGS. 1 through 4, there is illustrated the improved fence construction or fencing material of the invention and its method of manufacture. The construction includes a strip or sheet of plastic 10 which has a longitudinal dimension L or an elongated dimension and a width or lateral dimension W. The width or lateral dimension W is depicted in FIG. 2. The length or longitudinal dimension, depicted in FIG. 1, is variable depending upon the desired length of the run of fencing material that is being manufactured.

The plastic material which forms the strip 10 may have a wide variety of colors and patterns. The gauge of the plastic should be sufficient to fold over and retain wires as will be discussed below. The strip 10 is typically non-conductive, although it is possible to laminate layers of conductive materials or patterns of conductive material on the strip 10. Additionally, the strip 10 may have printing designs, embossings, cut-out patterns and the like to create a particular visual or aesthetic impression.

The strip 10 includes a first elongated side at 12 and a second elongated side at 14 parallel to the first side 12. A series of embossed or cut openings 16 and 18 are defined in each side 12, 14 respectively. A first conductive wire 20, for example, an aluminum, copper or an alloy wire, is arranged along side 12. A second conductive wire 22 is arranged along side 14. The first wire 20 is enfolded by the side 12 so that the openings 16 fold over the wire and expose, at least, a portion of the wire 20. The side 12 is adhered to the strip 10 by an adhesive or heat sealing or by any convenient means. In similar fashion, the second wire 22 is retained by folding the side 14 and adhering it to strip 10 so as to expose the wire 22 through the openings 18.

Thus, as depicted in FIG. 1, the wires 20 and 22 are enfolded in the strip 10 and retained in parallel array with the wires 20, 22 each being exposed through the embossment of cutout portions 16 and 18. In practice, an elongated assembly of the wires 20 and 22 and strip 10 are wound on a roll or coil for ease of transport and ultimate use in a fence.

FIG. 2 sets forth schematically the method of manufacture of the construction of FIG. 1. The leading edge of 24 of the strip 10 is retained by a clamp 26 which pulls the strip 10 and wires 20 and 22 in the direction of the arrow in FIG. 2 so as to wrap the assembled product around a reel or mandrel (not shown). The wires 20 and 22 are appropriately aligned so that the sides 12 and 14 may be folded over the wires 20, 22 as the entire assembly moves to the right in FIG. 2. As the strip 10 and wires 20, 22 move to the right in FIG. 2, a first and a second folding guide bar or horn 28 and 30 arranged respectively adjacent each side of the strip 10 will fold over the sides 12, 14 to cover the respective wires 20, 22. A heated block 32 and 34 seals the separated sides 12, 14 to the strip 10. Alternatively, glues or other adhesives may be utilized for this sealing or attachment step. The entire assembly may be manufactured in a continuous operation. Unit lengths can be cut at the appropriate time during the manufacturing process as the product is wound on a wheel or mandrel.

Figure 5:
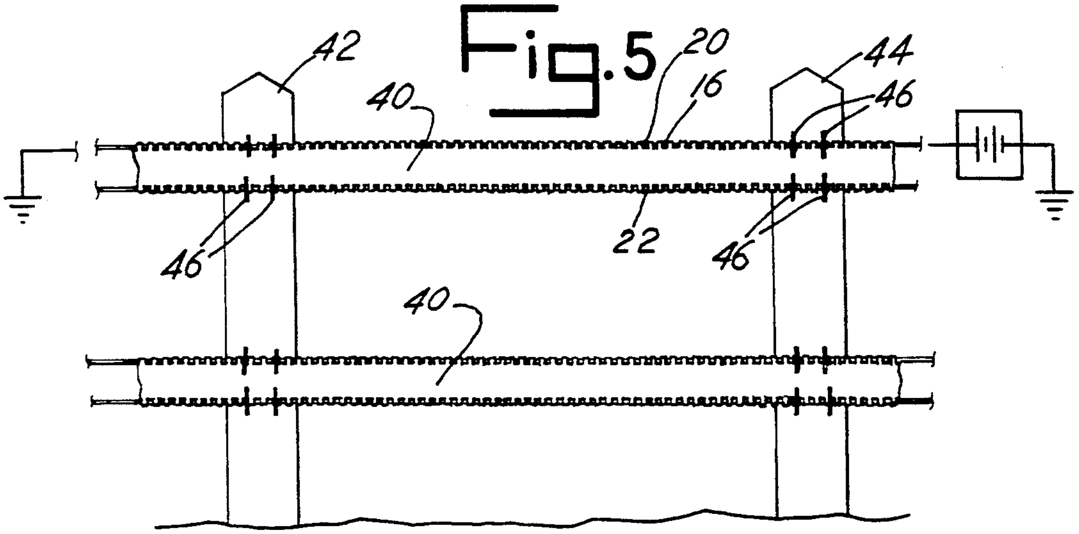
FIG. 5 is a elevation of a typical fence which incorporated the fence construction of the present invention and which further illustrates a manner in which the fence may be electrified.

FIG. 5 illustrates a manner of usage of the construction of the invention. The assembled panel or strip 40 can be stapled to separate fence posts 42 and 44 in a string of posts. Thus, staples 46 are used to attach the wires 20 and 22 to posts 42, 44. As depicted in FIG. 5, one or more strips of the fence construction may be utilized to create the appearance of a rail fence. One or more of the wires 20 may also be attached to a battery 46 in an electrical circuit to thereby electrify the fence. Since the wires 20 is exposed through the cut out sections embossments 16, contact therewith will result in an electric shock.

The fence thus provides an aesthetically pleasing construction because of the multiplicity of patterns that may be placed on the strip 40. Additionally, because of the lateral dimension W associated with the strip 40, it is visually apparent. It is possible, for example, to indicate that the fence is electrified by embossing a notice or warning on the fence. Additionally, it is possible to electrify any one or more of the wires which are attached through the fence and which comprise the strip construction. The construction of the invention is easy to handle and has a wide variety of uses both as an electrified and non-electrified fence construction. Thus, there are various alternatives associated with the invention. Therefore, the invention is to be limited only by the following claims and their equivalents.

What is claimed is:

1. An improved fencing construction comprising, in combination:

a nonconducting, plastic strip having a longitudinal dimension, a lateral dimension, and generally parallel sides defining edges of the strip;

a first and a second flexible wire, one wire positioned adjacent each of the generally parallel sides, each wire being enfolded by overlapping of each side of the plastic strip over the wire and attachment of the overlapped part of the strip to the said strip, said strip further including cut out portions adjacent at least one side to expose portions of at least one wire.

2. The fencing construction of claim 1 wherein the lateral dimension of the strip is significantly greater than the gauge of the wire.

3. The fencing construction of claim 1 wherein a wire is conductive.

4. The fencing construction of claim 1 wherein a wire is conductive and in combination with means for electrifying the conductive wire.

5. The fencing construction of claim 1 in combination with spaced fence posts, said wires being affixed to the posts to thereby define a fence barrier.

6. The fence construction of claim 1 in combination with spaced fence posts, a plurality of generally horizontal, parallel such constructions being affixed to the spaced posts to replicate a multiple rail fence barrier.

7. A method of manufacture of the fence construction of claim 1 comprising the steps of:

cutting a pattern of openings in a plastic strip adjacent at least one side, said openings being formed so as to expose a wire when the side of the strip is folded over the wire;

directing the strip in the longitudinal direction along a process manufacturing line as a generally flat strip with the sides initially unfolded, directing first and second wires in combination with the strip in the same longitudinal direction with the wires each overlaying an unfolded side of the strip;

folding sides of the strip over the wire on that side so as to overlap the strip in part and to permit exposure of at least a portion of the wire through at least some of the openings in the strip; and sealing the overlapped edge of the strip to the strip.

* * * * *